United States Patent Office 2,809,990
Patented Oct. 15, 1957

2,809,990

FLUOROCARBON ACIDS AND DERIVATIVES

Harvey A. Brown, Oakdale Township, Washington County, Minn., assignor to Minnesota Mining & Manufacturing Company, St. Paul, Minn., a corporation of Delaware No Drawing. Application December 29, 1955,
Serial No. 556,047

3 Claims. (Cl. 260—534)

This invention relates to my discovery of a new and useful class of fluorocarbon acids and derivatives which have notable utility as surface active agents and surface treating agents and as chemical intermediates for making still other surface active and surface treating compounds, although utility is not restricted thereto.

More particularly, these novel compounds are perfluoroalkanesulfonamido alkylenemonocarboxylic acids, which have in the molecule a perfluorocarbon "tail" containing 4 to 12 fully fluorinated carbon atoms, represented by the equivalent general formulas:

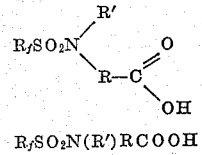

$R_fSO_2N(R')RCOOH$ and the corresponding acid chlorides, metal and ammonium salts, esters, and amides, thereof. These acids and derivatives are represented by the equivalent generic formulas:

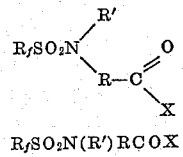

$R_fSO_2N(R')RCOX$

In these formulas, $R_f$ is a perfluoroalkyl group containing 4 to 12 carbon atoms (which provides the perfluorocarbon "tail"), R is an alkylene bridging group containing 1 to 18 carbon atoms, and R' is a hydrogen atom or an alyky group containing 1 to 6 carbon atoms (methyl, ethyl, propyl, butyl, amyl or hexyl).

In the second pair of formulas, X generically represents the carbonyl-bonded substituents which are responsible for the characteristic properties of the particular polar carboxylate structures of the acids and the corresponding derivatives mentioned above. It thus stands for the hydroxyl group (OH) in the acids, for the chloride atom (Cl) in the acid chlorides, for the salt group (OM, where M is the metal or ammonium substituent) in the salts, for the ester group (OR", where R" is a dehydroxylated alcohol residue) in the esters, and for the amido group (NH₂) in the unsubstituted amides made by reaction with ammonia (either or both of the hydrogens thereof being substituted by an organic group in the substituted amides made by reaction with primary or secondary amines). The mentioned derivatives are hydrolyzable to form the corresponding parent acids.

As is evident from the above formulas, the complete molecule of each compound has an inert non-polar perfluorocarbon "tail" group ($R_f$—) at one end and a functional polar carboxylate "head" group (—COX) at the other end, which are linked together by an interposed sulfonamidoalkylene "body" group (—SO₂N(R')R—).

The stable and inert terminal perfluorocarbon "tail" is non-polar and is both hydrophobic and oleophobic. It is repellent not only to water but to oils and hydrocarbons. It imparts unique surface active and surface treatment properties not possessed by corresponding compounds having a hydrocarbon tail, the latter being oleophilic and highly soluble in oils and hydrocarbons. The invention provides surface treating agents that coat the substrate so as to form a fluorocarbon type surface that is not only water repellent but is repellent to oils and greases. The invention provides surface active agents having a high degree of stability and that can be employed in minute concentration for reducing surface tension of aqueous and nonaqueous systems, and as emulsifying and dispersing agents, etc.

It is of critical importance that the perfluorocarbon "tail" contain at least four carbon atoms, and the preferred number is six to ten. A terminal fluorocarbon chain of this minimum length is required in order to insolubilize and render both hydrophobic and oleophobic the perfluoroalkanesulfoamido end of the molecule.

The perfluorocarbon "tail" structure may include an oxygen atom linking together two perfluorinated carbon atoms, or a nitrogen atom linking together three perfluorinated carbon atoms, since these linkages are very stable and do not impair the inert and stable fluorocarbon characteristics of the structure (cf., U. S. Patents Nos. 2,500,388 and 2,616,927).

Perfluoroalkanesulfonyl compounds useful as starting compounds for making the present compounds have been described in the copending application of T. J. Brice and P. W. Trott, S. N. 448,784, filed August 9, 1954, and issued as Patent No. 2,732,398 on January 24, 1956.

The present fluorocarbon acids may be regarded as N-substituted derivatives of amino acids of the monoaminomonocarboxylic acid type (H₂N—R—COOH) in which one N-bonded hydrogen atom is replaced by a perfluoroalkanesulfonyl group ($R_fSO_2$—) and the other hydrogen atom may or may not be replaced by an alkyl group.

These acids are weaker than the corresponding perfluoroalkylcarboxylic acids, $R_fCOOH$, and perfluoroalkanesulfonic acids, $R_fSO_2OH$.

The terminal carboxylate "head" (—COX) of the acid and acid-derivative molecules provides a solubilizing polar structure which can be selected to provide sufficient solubility of a compound in a desired aqueous or non-aqueous media to permit of functioning as a surface active agent, or to permit of being dissolved in a solvent medium to provide a coating or treating solution. This polar group also provides a means for bonding the molecule to a substrate surface when a compound is employed for surface treatment. Thus in the treatment of hydrophilic materials, such as paper, cloth, leather, metals, lithic materials, ceramic articles and glass, a solution of a compound (such as an acid or salt) can be prepared which is useful for treating the surface to provide (upon evaporation of the solvent) a thin coating of oriented molecules, the polar heads being bonded to the substrate and the tails projecting out to provide a fluorocarbon-like outer surface that is repellent to water, oils and greases.

The length of the bridging alkylene group, represented by —R— in the preceding formulas, can be varied to thereby modify solubility and surface properties. Increase in length of this hydrocarbon structure serves to increase solubility of the molecule in hydrocarbon media, and to decrease solubility in water, as well as to space the terminal structures of the molecule farther apart. The N-substituted alkyl side group (R' in preceding formulas) can be employed and varied to further increase solubility in hydrocarbon media and to decrease solubility in water, as compared to molecules wherein R' is a hydrogen atom.

Thus the general molecular structure of the present compounds can be varied to obtain compounds having specifically different characteristics, so that a compound having optimum properties for a given end use can be selected.

The presently preferred process of making my perfluoroalkanesulfonamido alkylenemonocarboxylic acids is outlined by the following equations showing the series of steps which can be used in deriving them from corresponding perfluoroalkanesulfonyl fluoride starting compounds (the preparation of the latter by means of an electrochemical fluorination process being described in the aforesaid copending application of Brice and Trott, now Patent No. 2,732,398):

$$R_fSO_2F + R'NH_2 \rightarrow R_fSO_2N(R')H$$

$$R_fSO_2N(R')H + NaOH \rightarrow R_fSO_2N(R')Na$$

$$R_fSO_2N(R')Na + ClRCOOC_2H_5 \rightarrow$$
$$R_fSO_2N(R')RCOOC_2H_5$$

$$R_fSO_2N(R')RCOOC_2H_5 + NaOH \rightarrow R_fSO_2N(R')RCOONa$$

$$R_fSO_2N(R')RCOONa + H_2SO_4 \rightarrow R_fSO_2N(R')RCOOH$$

In the above formulas, $R_f$, $R'$ and $R$ have the same meanings as in previous formulas.

This process thus consists in preparing a perfluoroalkanesulfonamide, converting this to a sulfonamide salt, converting the latter to an ester of the desired acid which is then hydrolyzed to a salt of the acid, and hydrolyzing the salt to form the product acid. This carboxylic acid can be used in preparing all of the previously mentioned derivatives by well known procedures.

The preparation of the subject compounds by the above and other processes is further disclosed in the following description of illustrative examples, which includes additional information on the properties of the compounds.

*Example 1*

This example illustrates the industrial preparation of the subject acids by the preferred process outlined above, which is employed in this instance to make N-ethyl, N-perfluorooctanesulfonyl glycine. The preparation of derivatives is also illustrated. This acid may be regarded as an N-disubstituted derivative of glycine, an amino acid having the formula $H_2NCH_2COOH$; one N-bonded hydrogen atom being replaced by an ethyl group ($—C_2H_5$) and the other by a perfluorooctanesulfonyl group $$(C_8F_{17}SO_2—)$$

The molecules of this product acid and its derivatives have a perfluorooctyl group which provides a perfluorocarbon "tail" containing eight carbon atoms.

Use was made of a jacketed 750 gallon stainless steel kettle equipped with an agitator and with means for heating and cooling, and with a distilling head.

The kettle was charged with 640 pounds of diisopropyl ether which was cooled to 65° F., and 108 pounds of ethylamine was added. Then 400 pounds of $C_8F_{17}SO_2F$ (perfluorooctanesulfonyl fluoride), B. P. 307–316° F., was added at such a rate as to maintain the temperature at 75° F., requiring approximately two hours. The reaction mixture was agitated for three hours at 75° F. and for two hours at 105° F. After cooling, the mixture was washed with 400 pounds of 9% hydrochloric acid solution, and upon standing the aqueous and non-aqueous phases separated into layers, and the lower (aqueous) layer was removed. The remaining product phase was rewashed with 400 pounds of an aqueous solution containing 4.5% hydrochloric acid and 4% ferrous sulfate solution, and the aqueous phase was again removed. Then 0.29 pound of morpholine was added to the product phase, and the ether was removed by distilling to a pot temperature of 180° F. at a pressure of 150 mm. This procedure provided the N-ethyl sulfonamido derivative of the starting compound, $C_8F_{17}SO_2NHC_2H_5$.

The product was cooled and 1230 pounds of acetone was added. The mixture was thoroughly agitated and addition was made of a slurry of 31.5 pounds of sodium hydroxide, 10.0 pounds of sodium carbonate and 58.5 pounds of water. The reaction mixture was refluxed with agitation for 30 minutes and cooled. Then 11.0 pounds of sodium iodide and 186 pounds of ethyl chloroacetate were added, and the mixture was refluxed and agitated for a period for eight hours. The mixture was filtered to remove precipitated sodium chloride and sodium carbonate, the filtrate recharged to the kettle, and the acetone was removed by vacuum distilling to a pot temperature of 180° F. at a pressure of 150 mm. This procedure provided the ethyl ester of the desired acid product, namely:

$$C_8F_{17}SO_2(C_2H_5)CH_2COOC_2H_5$$

A solution of 112 pounds of sodium hydroxide in 1540 pounds of water was added to the kettle material, and the mixture was agitated for 30 minutes at a temperature of 180° F. This resulted in a solution of the sodium salt:

$$C_8F_{17}SO_2N(C_2H_5)CH_2COONa$$

Then 270 pounds of concentrated sulfuric acid was added to the kettle at such a rate as to maintain the temperature at 180° F., and the acidified slurry was cooled slowly. The slurry was removed from the kettle and was filtered on a filter press. The wet cake was oven dried at a temperature of 180° F. to yield 407 pounds of crude N-ethyl, N-perfluorooctanesulfonyl glycine:

$$C_8F_{17}SO_2N(C_2H_5)CH_2COOH$$

The overall yield was 87.5%.

The following purification procedure has been employed for directly preparing purified acid from the wet filter cake obtained from the above process: The wet acid cake (75% solids) in the amount of 6.70 parts by weight is slurried with a solution consisting of 0.75 part of glacial acetic acid and 5.05 parts of water. The mixture is agitated and heated to a temperature of 175° F. and is then allowed to cool without agitation. The resulting slurry is filtered on a centrifuge. The filter cake is oven dried at a temperature of 180° F. to yield 3.88 parts of purified acid in dry solid form; a yield of 77%. Thus the overall yield of purified acid is approximately 67%. The acid can also be purified or further purified by recrystallizing from acetonitrile.

This acid in purified form is a white crystalline solid having a melting point of approximately 162° C. The neutral equivalent value was found to be 580 (versus 585 calculated for this acid). Analysis of a sample showed 24.4% carbon (24.65% calc.), 55.2% fluorine (55.25% calc.), and 2.39% nitrogen (2.39% calc.). This acid is only slightly soluble in water at room temperature (less than 0.1% by weight) but is sparingly to moderately soluble in oxygenated organic solvents, such as isopropanol (in excess of 1%) and ether (in excess of 10%). It is readily soluble in xylene hexafluoride and benzotrifluoride.

Salt derivatives can be readily prepared by known procedures for making salts from carboxylic acids, such as by reaction with a metal or ammonium hydroxide or carbonate, as illustrated by the following experiments:

20 grams of the acid was dissolved in 20 ml. of ethanol and neutralized to a pH of 7 with a saturated (12%) aqueous solution of lithium hydroxide. The product was dried in an oven at 110° C., yielding 20 grams of white crystalline solid identified as the lithium salt:

$$C_8F_{17}SO_2N(C_2H_5)CH_2COOLi$$

A 5 gallon steel vessel equipped with a mixer was charged with 6 pounds of the crude acid and 18 pounds of water. The slurry was heated to 150° F. with agitation and then 1.5 pounds of a 20% aqueous sodium hydroxide solution was added to bring the pH value to 8. The mixture was dried in an oven at 230° F., yielding 3.8 pounds of a white crystalline solid identified as the sodium salt:

$$C_8F_{17}SO_2N(C_2H_5)CH_2COONa$$

A 15 gallon steel vessel equipped with a propeller-type mixer was charged with 18 pounds of isopropanol. With continued mixing addition was made of 30 pounds of the above-mentioned crude acid and then of 62 pounds of water. The mixture was brought to a pH value of 9 by addition of 20% aqueous potassium hydroxide solution (about 15 pounds being required). Then 2 pounds of activated charcoal (decolorizer) and 4 ounces of diatomaceous earth (filter aid) were added. The mixture was agitated for one hour, allowed to stand without agitation for one-half hour, and filtered. The filter cake was dried in an oven for 3 days at 230° F., yielding 20.5 pounds of a white crystalline solid identified as the potassium salt:

$$C_8F_{17}SO_2N(C_2H_5)CH_2COOK$$

The ammonium salt:

$$C_8F_{17}N(C_2H_5)CH_2COONH_4$$

can be similarly prepared in solution form, as by mixing 2.8 pounds of purified acid with 5 pounds of isopropanol and 8 pounds of water. Neutralization is effected by slowly adding a solution of 20 parts of concentrated aqueous ammonium hydroxide in 80 parts of water so as to obtain a pH value of 7. This salt, unlike the sodium and potassium salts, gels with water over a wide range of proportions and cannot readily be processed to a dry solid form. It is most convenient to supply it and use it as a solution in isopropanol-water solvent, which can be made up to desired concentration. Surfaces coated with the solution can be heated to dry the salt and provide a thin surface coating thereof.

The high degree of surface activity of the salts is shown by the effect in reducing the surface tension of water. Pure water has a surface tension at 25° C. of 72 dynes/cm. The additional of 0.1% by weight of the above potassium salt reduced this value to 14 dynes/cm.; and additions of 0.1% of the lithium salt and of the ammonium salt reduced the value to 15 and 19, respectively. The acid is so highly insoluble in pure water that it is only able to lower the surface tension to 46 dynes/cm. The ammonium salt does not form water-repellent coatings on surfaces owing to its water-solubility. The acid and all of the salts form oil-repellent coatings. The lithium salt exhibits notable surface activity in hydrocarbon media, the addition of 0.1% lowering the surface tension of heptane by 0.9 dyne/cm. and that of white mineral oil by 2.9 dynes/cm. at 25° C.

The preparation of polyvalent-metal salts can be effected by neutralizing the acid with aqueous ammonium hydroxide solution and adding to the solution an aqueous solution of a chloride salt of the metal so as to precipitate out the metal salt of the acid, which is then filtered, washed with water and dried. The polyvalent-metal salts are highly insoluble in water and in common organic solvents but are soluble in fluorinated solvents. For example, 5 parts of the above-mentioned acid was slurried with 20 parts of water and dropwise addition with stirring was made of aqueous NH$_4$OH (10% solution) until the acid was dissolved. The solution was diluted to 75 parts by addition of water. Addition was made of 1 part of AlCl$_3$ dissolved in 10 parts of water, which resulted in immediate precipitation of the aluminum salt. Filtering, washing with water, and drying at 110° C., resulted in a white crystalline salt product. Similarly, to 4 parts of the acid dissolved in NH$_4$OH solution and diluted to 75 parts, addition was made of 0.4 part of ZrCl$_4$ dissolved in 10 parts of water, resulting in precipitation of the zirconium salt, which was filtered out, washed with water, and dried at 110° C., to obtain a tan-colored salt product. Solutions of these metal salts in "Freon 113" (CFCl$_2$·CF$_2$Cl) when applied to base surfaces and dried, resulted in thin surface coatings that were very water-repellent and oil-repellent.

This experiment illustrates the preparation of the acid chloride derivative: To a flask equipped with a reflux condenser were added 17.61 grams of the acid and 25 ml. of thionyl chloride (SOCl$_2$). The mixture was refluxed for two hours and then the excess thionyl chloride was distilled off under reduced pressure. The solid residue was recrystallized from hexene, yielding 15.06 grams of relatively pure solid product melting at 67–69° C., identified as:

$$C_8F_{17}SO_2N(C_2H_5)CH_2COCl$$

Analysis showed 2.30% N (2.31% calc.) and 5.93 Cl (5.88% calc.). Infrared analysis was consistent with this identification.

The following experiments further illustrate the preparation of esters:

To a flask equipped with a reflux condenser were added 193.7 grams of the acid, 48 grams of 2-ethyl butanol and 2 grams of p-toluene sulfonic acid (serving as a catalyst), and 400 ml. of benzene as a solvent; the mixture being heated to form a solution. The solution was refluxed for four hours using a water entrainment trap. The water formed in the esterification was collected and the benzene was returned to the reaction mixture, slightly more than the theoretical amount of water being recovered. The mixture was cooled and filtered and the benzene was removed by distillation. The distillation was continued and 144 grams of product boiling at 150° C. at 0.6 mm. vacuum was recovered. The crude product was dissolved in ether and the solution was washed with 1 N aqueous potassium hydroxide and then twice with water. The ether solution was dried and redistilled. The resulting product had a melting range of 32–52° C. and a boiling point of 302° C. It was identified as the expected ester:

$$C_8F_{17}SO_2N(C_2H_5)CH_2COOCH_2CH(C_2H_5)_2$$

Analysis showed 2.06% N (2.09% calc.). This ester is only slightly soluble in water but it is soluble to the extent of more than 10% in fluorocarbon solvents, benzotrifluoride, benzene, toluene, methyl-ethyl ketone, isopropanol, acetone and ether. The addition of 0.1% to water reduces the surface tension to 47 dynes/cm. This ester has a flash point of 359° F. and a fire point of 366° F.

In another experiment the flask was charged with 146.8 grams of the acid, 33.5 grams of the monoethyl ether of diethylene glycol, 2 grams of p-toluene sulfonic acid, and 400 ml. of toluene. The mixture was heated to form a solution, and then refluxed for 24 hours using a water entrainment trap, the toluene being returned. The toluene was then removed under vacuum and the remaining mixture was further distilled to yield a fraction boiling at 173–180° C. at 0.6 mm. This fraction was dissolved in ether and the solution was washed with 5% aqueous potassium hydroxide and then with water. The ether layer was dried and redistilled, yielding 91.6 grams of relatively pure compound boiling at 150–153° C. at 0.15 mm. The product was a viscous oily liquid which formed a glass at −5° C. and had a boiling point of 354° C. It was identified as the expected ester:

$$C_8F_{17}SO_2N(C_2H_5)CH_2COO(CH_2)_2O(CH_2)_2OC_2H_5$$

Analysis showed 1.99% N (1.99% calc.). This ester is only slightly soluble in water and only sparingly soluble (1 to 4%) in organic solvents such as benzene, toluene, methyl-ethyl ketone, isopropanol, acetone and ether. It is soluble to the extent of more than 10% in benzotrifluoride and in fluorocarbon solvents. The addition of 0.1% to water reduces the surface tension to 21 dynes/cm. This ester has a flash point of 394° F. and a fire point of 406° F.

The vinyl and allyl esters can be made by reaction of the acid with vinyl acetate and allyl alcohol, respectively, in the presence of a suitable catalyst. These vinyl-type esters can be polymerized to yield polymers useful for sizing cloth to impart water-repellency and resistance to oily and greasy materials. Such esters and polymers are described more fully and are claimed in the companion application of A. H. Ahlbrecht and myself filed of even date herewith, S. N. 556,074.

The unsubstituted amide derivative of the acid was prepared by dissolving 1.0 gram of the acid chloride, $C_8F_{17}SO_2N(C_2H_5)CH_2COCl$, in 25 ml. of ether. Anhydrous ammonia gas was bubbled through the solution until no more was absorbed. The reaction mixture was filtered and the ether layer was evaporated to dryness. The residue was recrystallized from carbon tetrachloride. The product was a white crystalline material having a melting point of about 158° C., identified as $$C_8F_{17}SO_2N(C_2H_5)CH_2CONH_2$$

Analysis showed 4.6% nitrogen (4.8% calc.).

Substituted amide derivatives can be prepared by reacting the acid chloride with primary and secondary amines. Thus reaction with ethylamine yields:

$$C_8F_{17}SO_2N(C_2H_5)CH_2CONHC_2H_5$$

Reaction with dibutylamine yields:

$$C_8F_{17}SO_2N(C_2H_5)CH_2CON(C_4H_9)_2$$

Reaction with allylamine yields:

$$C_8F_{17}SO_2N(C_2H_5)CH_2CONHCH_2CH=CH_2$$

The acid chloride derivative of the acid was converted to an amidoalkylene dialkylamine derivative having strong surface active properties, further illustrating the preparation of substituted amide derivatives. A flask was charged with a solution of 12.06 grams of $$C_8F_{17}SO_2N(C_2H_5)CH_2COCl$$

in 80 ml. of ether and addition was made over a period of one hour of 2.04 grams of beta-dimethylaminopropylamine, $H_2N(CH_2)_3N(CH_3)_2$. The mixture was stirred and refluxed for an additional hour. A crude white solid product was formed and was collected by filtration. It weighed 12.1 grams and was water-soluble and surface-active. 9.1 grams was dissolved in 800 ml. of water (solution pH of 4) and solid potassium hydroxide was added until a pH of 12 was reached. This solution was extracted thoroughly with ether. The addition of potassium chloride was found to facilitate the separation of the ether and aqueous phases. The ether phase was dried with magnesium sulfate, filtered, and the ether was evaporated, yielding 6.75 grams of a relatively pure light yellow compound melting at 81–83° C. Sublimation gave a more highly purified sample melting at 83–84° C. This compound was identified as:

$$C_8F_{17}SO_2N(C_2H_5)CH_2CONH(CH_2)_3N(CH_3)_2$$

Analysis showed 6.23% N (calc. 6.24%).

This compound was quaternized by reaction with ethyl bromide to yield the quaternary ammonium salt in relatively pure form. It was a light yellow solid, melting at 144–147° C., which was water soluble and highly surface active. Analysis showed 10.2% Br (10.3% calc.). This compound has the formula:

$$\left[ C_8F_{17}SO_2N(C_2H_5)CH_2CONH(CH_2)_3N\begin{matrix}CH_3\\-CH_3\\C_2H_5\end{matrix}\right]^+ Br^-$$

Chromium coordination complexes of the acid can be readily prepared by reacting chromyl chloride ($CrO_2Cl_2$) with the acid in an isopropanol vehicle which serves both as solvent and as reducing agent. The complex is a green solid and is most conveniently supplied as a concentrate dissolved in isopropanol, which can be diluted with water by the user. A 0.01 to 10% treating solution is highly effective for sizing paper to impart both water-repellency and resistance to oily and greasy materials. Drying and heating hydrolyzes the complex and causes it to polymerize in situ. Complexes having chromium to acid mole ratios of about 2:1 to 20:1 are effective for sizing paper. These complexes are described more fully and are claimed in my companion application filed of even date herewith, S. N. 556,039.

*Example 2*

This example illustrates a different preparatory process, used in this case to make N-perfluorooctanesulfonyl glycine, which differs from the acid of the previous example in that it has an N-bonded hydrogen atom rather than an ethyl side group.

This acid product was prepared by oxidation of N-allyl perfluorooctanesulfonamide, $C_8F_{17}SO_2NHCH_2CH=CH_2$, which was made by reacting allylamine with perfluorooctanesulfonyl fluoride.

This sulfonamide starting compound was prepared as follows: To a flask containing 50.2 grams of $C_8F_{17}SO_2F$ dissolved in 50 ml. of ether there was added 14.3 grams of allylamine dissolved in 300 ml. of ether. The reaction mixture was allowed to stand overnight and was then filtered to remove the hydrofluoride salt of allylamine. The etheral solution was washed with dilute hydrochloric acid and water. After drying over calcium sulfate, the solution was evaporated to dryness, yielding 49.9 grams of crude product, which was purified by recrystallization from carbon tetrachloride. It had a melting point of 85–86° C.

The acid product was prepared as follows: To a flask containing 100 ml. of anhydrous ethyl acetate there was added 18 grams of the above-mentioned sulfonamide. The solution was cooled to and held at 0° C. and ozonized oxygen was passed through the solution until no more ozone was absorbed, requiring 17½ hours. Part of the ethyl acetate was removed by distillation under reduced pressure and then a portion of 150 ml. of acetic acid was added. The remainder of the ethyl acetate was removed and the rest of the acetic acid was added. The solution was then dropped slowly into a mixture of 20 grams of 30% hydrogen peroxide, 2 ml. of concentrated sulfuric acid and 150 ml. of water. The resulting mixture was refluxed for two hours and cooled to room temperature. The gelled product was extracted with ether. The ethereal extract was then evaporated to dryness, yielding 17.7 grams of crude acid product, which was purified by twice recrystallizing from acetonitrile.

The product was a white crystalline solid having a melting point of 190–191.5° C., identified as:

$$C_8F_{17}SO_2NHCH_2COOH$$

Analysis showed 21.6% C (21.55% calc.), 58.0% F (57.96% calc.), and 2.54% N (2.51% calc.). The neutral equivalent value was 281 (278.6 calc.). The infrared spectral analysis was consistent. Addition of 0.1% of this acid to water lowered the surface tension to 37 dynes/cm. Addition of 0.1% of the sodium salt lowered the surface tension to 18 dynes/cm.

Using a similar procedure, N-perfluoropentanesulfonyl glycine:

$$C_5F_{11}SO_2NHCH_2COOH$$

was prepared from N-allyl perfluoropentanesulfonamide. It was a white crystalline solid having a melting point of 165–166° C. Analysis showed 51.6% F (51.33% calc.) and 3.45% N (3.44% calc.). Addition of 0.1% of this acid to water lowered the surface tension to 27 dynes/cm.

A similar procedure was used in preparing N-perfluorodecanesulfonyl glycine:

$$C_{10}F_{21}SO_2NHCH_2COOH$$

from N-allyl perfluorodecanesulfonamide. It had a melting point of 193° C. Analysis showed 60.9% F (60.71% calc.) and 2.09% N (2.13% calc.). Addition to water of 0.1% of the sodium salt of this acid lowered the surface tension to 23 dynes/cm. The acid is so highly insoluble in water that it is only able to lower the surface tension to 56 dynes/cm.

*Example 3*

To a solution of 0.56 gram of sodium hydroxide in 20 ml. of water there was added 5.5 grams of perfluorooctanesulfonamide, $C_8F_{17}SO_2NH_2$, and the mixture was stirred until all of the amide was in solution. Then 1.08 grams of beta-propiolactone was added and the reaction mixture was allowed to stand overnight. It was acidified with dilute hydrochloric acid and the solid acid product was filtered off and dried. The crude acid was purified by recrystallization from acetonitrile. It was identified as:

$$C_8F_{17}SO_2NHCH_2CH_2COOH$$

The melting point was 167–169° C. The neutral equivalent value was 282 (calc. 285). The infrared spectral analysis was consistent.

*Example 4*

This and the following example illustrate the preparation of acid products having a relatively long alkylene bridging group in the molecule.

The starting compound was N-methyl perfluorooctanesulfonamide, $C_8F_{17}SO_2NHCH_3$, of which 51.3 grams was neutralized with 2.3 grams of sodium dissolved in methanol. The solution was evaporated to dryness and 100 grams of acetone and 32.7 grams of ethyl bromoundecylate, $Br(CH_2)_{10}COOC_2H_5$, were added. The mixture was refluxed for 18 hours, poured into ether, and the sodium bromide precipitate was filtered off. The filtrate was vacuum distilled and 55.5 grams of a cut which came over at 180–185° C. (0.075 mm.) was collected. This material had a melting point of 53° C. and was the ethyl ester of the desired acid. A mixture of 40 grams thereof, 20 grams of acetic acid and 0.5 gram of concentrated sulfuric acid was refluxed for 2½ hours, following which the ethyl acetate and acetic acid were distilled off. The residue was poured into ether and the solution was washed with water. Evaporation of the ether yielded 35 grams of a white powder which was identified as the desired acid:

$$C_8F_{17}SO_2N(CH_3)(CH_2)_{10}COOH$$

The melting point was 97–98° C. Analysis showed 47.1% F (47.6% calc.) and 2.00% N (2.07% calc.).

Addition to water of 0.1% of the sodium salt of this acid lowered the surface tension to 26 dynes/cm. The acid is so highly insoluble in water that it is only able to lower the surface tension to 58 dynes/cm.

Acids with even longer fatty acid terminal chains can be prepared, as by employing ethyl-omega-bromostearate in the above procedure to obtain $$C_8F_{17}SO_2N(CH_3)(CH_2)_{17}COOH$$

The salts of this acid provide a molecule in which a "soap" chain is linked to a perfluoroalkanesulfonamido chain having a perfluorocarbon "tail."

*Example 5*

Using a similar procedure but employing as the amide starting compound N-ethyl perfluorooctanesulfonamide, the desired crude acid derivative was recovered in a 72% yield upon fractional vacuum distillation of the final reaction mixture, coming off as the fraction boiling at 170–171° C. at 0.15 mm. This was purified in a similar manner to obtain an 83% yield of a white powder melting at 50–52° C. which was identified as the desired acid in relatively pure form, namely:

$$C_8F_{17}SO_2N(C_2H_5)(CH_2)_{10}COOH$$

This acid is highly insoluble in water but the salts are sufficiently soluble therein to exhibit a high degree of surface activity. Coatings of the acid on base surfaces exhibit both water and oil repellency.

I claim:

1. The new and useful fluorocarbon compounds of the class consisting of the perfluoroalkanesulfonamido alkylenemonocarboxylic acids having the formula:

$$R_fSO_2N(R')RCOOH$$

wherein $R_f$ is a perfluoroalkyl group containing 4 to 12 carbon atoms, R is an alkylene bridging group containing 1 to 18 carbon atoms, and R' is of the class consisting of a hydrogen atom and alkyl groups containing 1 to 6 carbon atoms; and the corresponding acid chlorides, metal and ammonium salts, esters, and amides, thereof.

2. The compounds of claim 1 in which said perfluoroalkyl group is a perfluorooctyl group that provides the molecule with a perfluorocarbon "tail" containing eight carbon atoms.

3. N-ethyl, N-perfluorooctanesulfonyl glycine, having the formula:

$$C_8F_{17}SO_2N(C_2H_5)CH_2COOH$$

References Cited in the file of this patent

FOREIGN PATENTS

| | | |
|---|---|---|
| 767,071 | Germany | Nov. 17, 1952 |
| 928,169 | Germany | May 26, 1955 |